US011381502B2

(12) United States Patent
Chen et al.

(10) Patent No.: US 11,381,502 B2
(45) Date of Patent: Jul. 5, 2022

(54) METHOD AND DEVICE FOR NOTIFYING BINDING INFORMATION, AND STORAGE MEDIUM

(71) Applicant: NANJING ZTE NEW SOFTWARE CO., LTD., Jiangsu (CN)

(72) Inventors: Ran Chen, Jiangsu (CN); Shaofu Peng, Jiangsu (CN)

(73) Assignee: NANJING ZTE NEW SOFTWARE CO., LTD., Jiangsu (CN)

( * ) Notice: Subject to any disclaimer, the term of this patent is extended or adjusted under 35 U.S.C. 154(b) by 0 days.

(21) Appl. No.: 17/040,108

(22) PCT Filed: Dec. 19, 2018

(86) PCT No.: PCT/CN2018/122053
§ 371 (c)(1),
(2) Date: Sep. 22, 2020

(87) PCT Pub. No.: WO2019/179188
PCT Pub. Date: Sep. 26, 2019

(65) Prior Publication Data
US 2021/0029033 A1 Jan. 28, 2021

(30) Foreign Application Priority Data
Mar. 23, 2018 (CN) .......................... 201810247523.4

(51) Int. Cl.
*H04L 45/741* (2022.01)
*H04L 45/02* (2022.01)

(52) U.S. Cl.
CPC ............ *H04L 45/741* (2013.01); *H04L 45/02* (2013.01); *H04L 45/04* (2013.01)

(58) Field of Classification Search
None
See application file for complete search history.

(56) References Cited

U.S. PATENT DOCUMENTS

2017/0289028 A1    10/2017  Ratnasingham
2019/0215267 A1*   7/2019   Filsfils ................. H04L 45/021

FOREIGN PATENT DOCUMENTS

CN     107276899 A      10/2017
WO     WO-2019011114 A1 *  1/2019  ............ H04L 45/34

OTHER PUBLICATIONS

China Patent Office, Third Office Action dated Jan. 12, 2022, for corresponding Chinese application No. 201810247523.4.
(Continued)

*Primary Examiner* — Anh Ngoc M Nguyen
(74) *Attorney, Agent, or Firm* — Li & Cai Intellectual Property (USA) Office (57) ABSTRACT

A method for notifying binding information, including: acquiring, by an allocation node, SR-TE path information; binding, by the allocation node, an IPV6 SID corresponding to the SR-TE path information with the SR-TE path information so as to obtain SRV6 binding information between the SR-TE path information and the IPV6 SID; and notifying, by the allocation node, the SRV6 binding information to a preset node through an extended PCEP.

9 Claims, 6 Drawing Sheets (56) References Cited

OTHER PUBLICATIONS

S. Sivabalan, et al., "Carrying Binding Label/Segment-ID in PCE-based Networks.; draft-sivabalan-pce-binding-label-SID-03.tex", dated Jul. 3, 2017, PCE Working Group Internet-Draft, Internet Engineering Task Force (IETF).

M. Negi, et al., "PCEP Extensions for Segment Routing leveraging the IPv6 data plane Draft-negi-pce-segment-routing-ipv6-00.TXT", dated Oct. 18, 2017, PCE Working Group Internet-Draft, Internet Engineering Task Force (IETF).

* cited by examiner

METHOD AND DEVICE FOR NOTIFYING BINDING INFORMATION, AND STORAGE MEDIUM

TECHNICAL FIELD

The present disclosure relates to, but is not limited to, the field of communication technology, and in particular, to a method and a device for notifying binding information, and a storage medium.

BACKGROUND

In network communication, Segment Routing (SR) is a source routing technology, and when this technology is used, a forwarding point does not need to sense a service state, and only needs to maintain information of topology points, so that decoupling of the number of service instances and a network can be achieved, and capability and extensibility of the network to support pervasive connections are greatly improved. The principle of the SR is that a source node pushes an instruction carrying routing information into a header of a message, and an intermediate forwarding point pops up a related instruction hop by hop to forward the message. The SR technology considers two types of encapsulation in a data plane, i.e., Multi-Protocol Label Switching (MPLS) encapsulation and Internet Protocol Version 6 (IPv 6) encapsulation. A MPLS forwarding plane can be applied to a SR model without any modification. IPv6 defines a new Routing Header Type (RHT) for the SR, defines an SR-related routing extension header, and provides source-based routing capability.

A Path Computation Element (PCE) is an entity capable of computing a path between any nodes known to the PCE in an Autonomous System (AS), and the PCE may be integrated within a router, may exist in the network as a separate entity, or may be integrated with a network management system. The PCE is particularly useful because the PCE has better knowledge of network traffic and path selection within its AS and, thus, may be used for better path computation. A Bit Index Explicit Replication (BIER) node may operate as a Path Computation Client (PCC) configured to send a path computation to the PCE and receive a response with a computed path.

A series of numbered documents (RFCs) describe a Path Computation Element Protocol (PCEP) for communication between the PCC and the PCE, or between two PCEs.

The SR technology is very convenient to be combined with the PCE technology, especially when a Segment Routing Traffic Engineering (SR-TE) path is deployed in the network, it needs to notify of binding information between a segment of the SR-TE path and an IPv6 Segment Identifier (IPv6 SID), i.e., SRV6 binding information.

To implement an end-to-end traffic engineering policy, and since the SRV6 binding information is locally allocated by the PCC, the SRV6 binding information needs to be notified to the PCE. If the PCE allocates the SRV6 binding information, the SRV6 binding information needs to be notified to the PCC for path forwarding. However, notifying of the SRV6 binding information is not possible with techniques known in the art.

SUMMARY

Embodiments of the present disclosure provides a method and a device for notifying binding information, and a storage medium, where an SR-TE path is bound to an IPV6 SID, and the binding information is notified to a corresponding node through a PCEP protocol, so as to implement notifying of the SRV6 binding information.

An embodiment of the present disclosure provides a method for notifying binding information, and the method includes: acquiring, by an allocation node, SR-TE path information; binding, by the allocation node, an IPV6 SID corresponding to the SR-TE path information with the SR-TE path information to obtain SRV6 binding information between the SR-TE path information and the IPV6 SID; and notifying, by the allocation node, the SRV6 binding information to a preset node through an extended PCEP.

An embodiment of the present disclosure provides a device for notifying binding information, and the device at least includes: a processor and a storage medium configured to store executable instructions, the processor is configured to execute the executable instructions configured to perform the method for notifying binding information described above.

An embodiment of the present disclosure provides a computer-readable storage medium having stored therein computer-executable instructions configured to perform the method for notifying binding information described above.

DETAILED DESCRIPTION

Embodiments of the present disclosure are described below with reference to the accompanying drawings.

In the following description, suffixes such as "module", "component", or "unit" used to indicate elements are used only for facilitating an explanation of the present disclosure, and have no particular meaning in themselves. Thus, "module", "component" or "unit" may be used mixedly.

A device, such as an electronic device, may be implemented in various forms. For example, the device described in the present disclosure may include a mobile terminal such as a mobile phone, a tablet computer, a notebook computer, a palmtop computer, a Personal Digital Assistant (PDA), a Portable Media Player (PMP), a navigation device, a wearable device, a smart band, a pedometer, and the like, or a fixed terminal such as a Digital Television (TV), a desktop computer, and the like.

While the following description will be given by taking a mobile device as an example, it will be appreciated by those skilled in the art that configurations according to the embodiments of the present disclosure can be applied to a fixed device, in addition to elements specifically used for mobile purposes.

Figure 1:
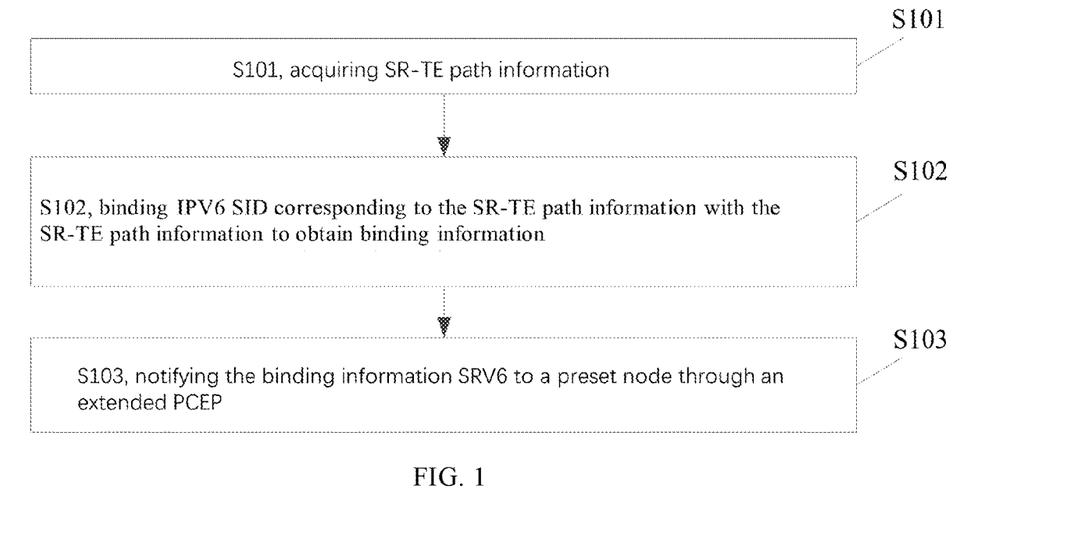
FIG. 1 is a schematic flowchart illustrating an implementation flow of a method for notifying binding information according to an embodiment of the present disclosure.

FIG. 1 is a schematic view illustrating an implementation flow of a method for notifying binding information according to an embodiment of the present disclosure, and as shown in FIG. 1, the method may include the following steps S101 to S103.

At step S101, an allocation node acquires SR-TE path information.

Here, the allocation node may be a PCC or a PCE. When the allocation node is the PCE, the PCE may compute to obtain the SR-TE path information according to a path computation request sent by the PCC and network topology information of a network where the PCE is located. When the allocation node is the PCC, the PCC may receive the SR-TE path information sent by the PCE.

At step S102, the allocation node binds an IPV6 SID corresponding to the SR-TE path information with the SR-TE path information to obtain SRV6 binding information between the SR-TE path information and the IPV6 SID.

Here, when the allocation node is the PCC, the following two cases may be included.

In a first case, when the PCC receives the SR-TE path information sent by the PCE, but does not receive the SRV6 binding information corresponding to the path information sent by the PCE, the PCC may bind the path information and the IPV6 SID corresponding to the path, to obtain the SRV6 binding information between the path information and the IPV6 SID.

In a second case, when the PCE does not receive the SRV6 binding information sent by the PCC through PCEP, the PCE may request the PCC to allocate the IPV6 SID to the SR-TE path information.

The PCC may allocate, to the SR-TE path information, the IPV6 SID corresponding to the SR-TE path information, to obtain the SRV6 binding information between the SR-TE path information and the IPV6 SID.

When the allocation node is the PCE, the PCE may actively allocate the IPV6 SID corresponding to the SR-TE path information, to obtain the SRV6 binding information between the SR-TE path information and the IPV6 SID.

At step S103, the allocation node notifies the SRV6 binding information to a preset node through an extended PCEP.

Here, when the allocation node is the PCC, the preset node may be the PCE; and when the allocation node is the PCE, the preset node may be the PCC.

The allocation node notifying the SRV6 binding information to the preset node through the extended PCEP may include: the allocation node notifies the SRV6 binding information to the preset node via a report message of the extended PCEP.

In the embodiment of the present disclosure, firstly, the allocation node acquires segment routing-traffic engineering (SR-TE) path information; secondly, the allocation node binds an Internet Protocol version 6 Segment Identifier (IPv6 SID) corresponding to the SR-TE path information with the SR-TE path information to obtain the SRV6 binding information between the SR-TE path information and the IPV6 SID; finally, the allocation node notifies the SRV6 binding information to the preset node through the extended PCEP; in such way, the SR-TE path is bound to the IPV6 SID, and the binding information is passed to a corresponding node through the PCEP, so as to implement notifying of the SRV6 binding information.

In other embodiments, a correspondence between the allocation node and the preset node may include the following two types.

In a first type, when the allocation node is the PCE and the preset node is the PCC, the allocation node acquiring the segment routing-traffic engineering (SR-TE) path information includes: computing, by the PCE, to obtain the SR-TE path information according to the path computation request sent by the PCC and the network topology information of the network where the PCE is located, and accordingly, the notifying the SRV6 binding information to the preset node through the extended PCEP may include: notifying, by the PCE, the SRV6 binding information to the PCC through a report message of the extended PCEP.

In a second type, when the allocation node is the PCC and the preset node is the PCE, the allocation node acquiring the segment routing-traffic engineering (SR-TE) path information includes: receiving, by the PCC, the SR-TE path information sent by the PCE, and accordingly, the notifying the SRV6 binding information to the preset node through the extended PCEP may include: notifying, by the PCC, the SRV6 binding information to the PCE through the extended PCEP.

Figure 2A:
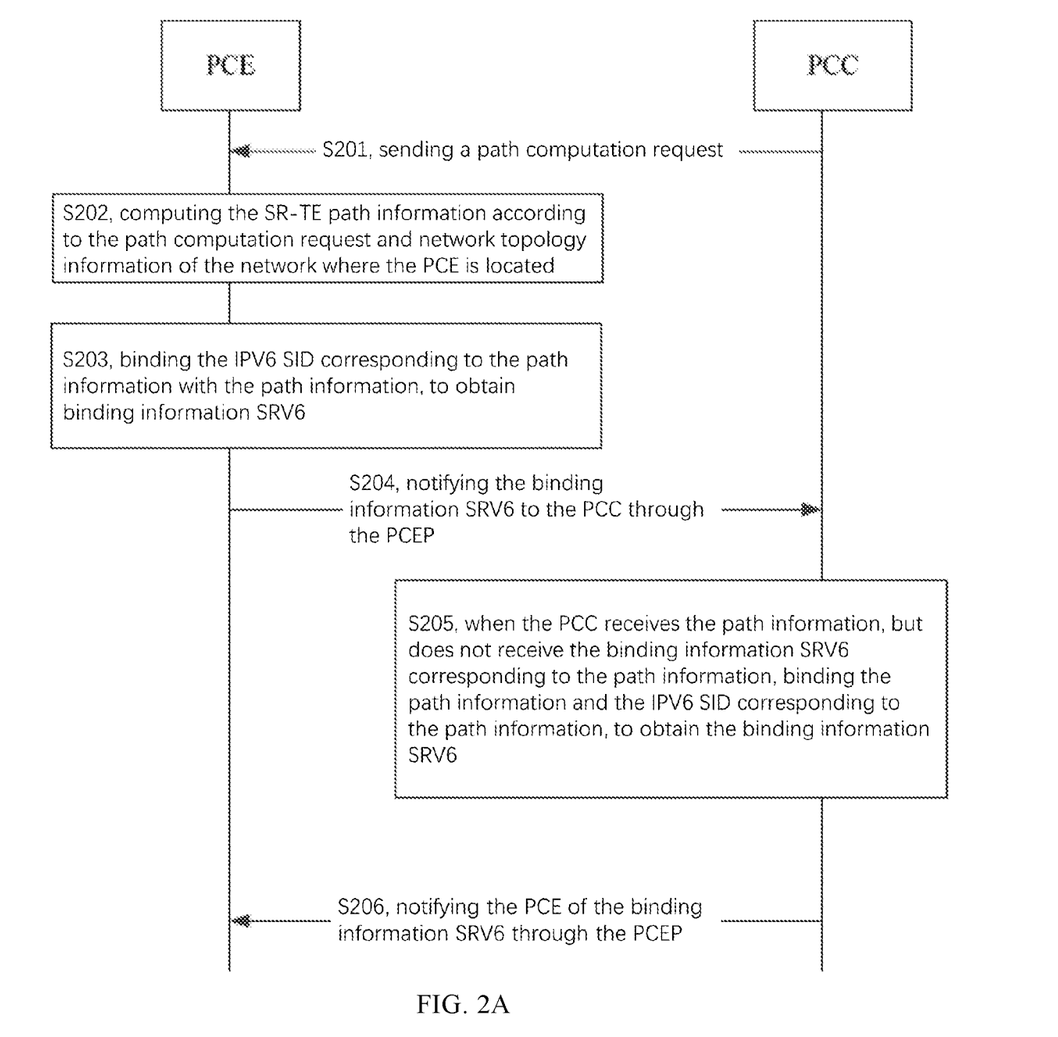
FIG. 2A is a schematic flowchart illustrating another implementation flow of a method for notifying binding information according to an embodiment of the present disclosure.

FIG. 2A is a schematic flowchart illustrating another implementation flow of a method for notifying binding information according to an embodiment of the present disclosure, and as shown in FIG. 2A, the method may include the following steps S202 to S206.

At step S201, the PCC sends a path computation request to the PCE.

Here, the path computation request may be used to request the PCE to perform path computation for the PCC.

At step S202, the PCE computes the SR-TE path information according to the path computation request and the network topology information of the network where the PCE is located.

Here, first, the PCC may send the path computation request to the PCE, so as to request the PCE to perform path computation for the PCC; and then the PCE may respond to the path computation request and compute the SR-TE path information according to network topology information of the network where the PCE is located.

At step S203, the PCE binds an IPV6 SID corresponding to the path information with the path information, to obtain SRV6 binding information between the path information and the IPV6 SID.

Here, the PCE binds the path information and the IPV6 SID, which may be considered as that the PCE actively matches the path with the IPV6 SID corresponding to the path, and obtains the SRV6 binding information.

At step S204, the PCE notifies the SRV6 binding information to the PCC through the PCEP.

Here, the PCE may notify the SRV6 binding information to the PCC through a report message of an extended PCEP, and it may also be considered that the PCE sends the computed path information and the SRV6 binding information to the PCC, thereby implementing notifying of the SRV6 binding information.

At step S205, when the PCC receives the path information sent by the PCE, but does not receive the SRV6 binding information corresponding to the path information sent by the PCE, the PCC binds the path information and the IPV6 SID corresponding to the path information, to obtain the SRV6 binding information between the SR-TE path information and the IPV6 SID.

Here, when the PCC receives the SR-TE path information sent by the PCE, but does not receive the SRV6 binding information corresponding to the path information sent by the PCE, it may be understood as that, when the PCE sends the computed path information to the PCC, the SRV6 binding information is not sent to the PCC.

At step S206, the PCC notifies the SRV6 binding information to the PCE through the PCEP.

Here, the PCC may send the SRV6 binding information to the PCE through a report message of the extended PCEP.

The steps 205 to 206 may be understood as that, when the PCE sends the path information to the PCC and does not send the SRV6 binding information corresponding to the path information to the PCC, the PCC actively allocates the IPV6 SID corresponding to the path to the received path information.

Figure 2B:
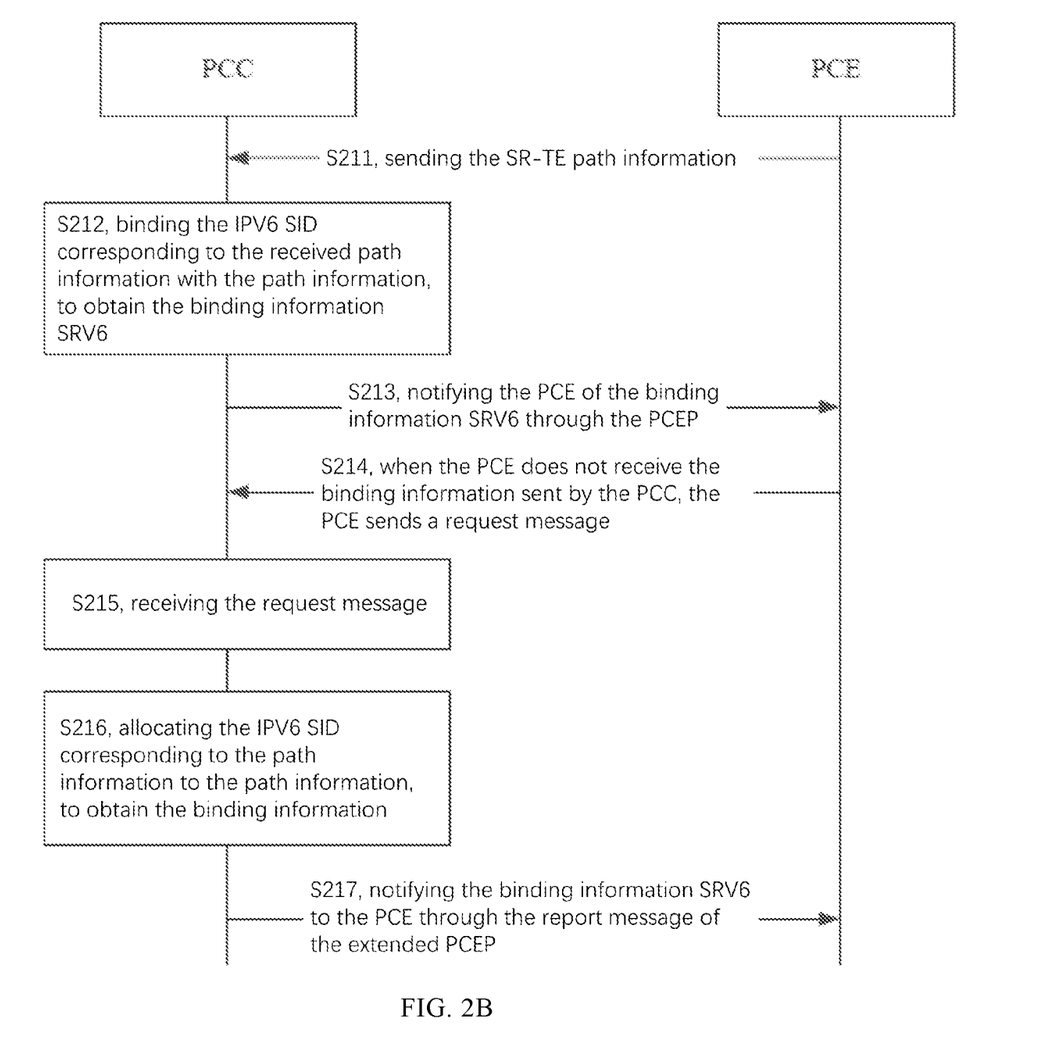
FIG. 2B is a schematic flowchart illustrating further another implementation flow of a method for notifying binding information according to an embodiment of the present disclosure.

FIG. 2B is a schematic flowchart illustrating further another implementation flow of a method for notifying binding information according to an embodiment of the present disclosure, and as shown in FIG. 2B, the method may include the following steps S211 to S217.

At step S211, the PCE sends the SR-TE path information to the PCC.

At step S212, the PCC binds an IPV6 SID corresponding to the received path information with the path information, to obtain the SRV6 binding information between the path information and the IPV6 SID.

Here, the PCC binding the IPV6 SID corresponding to the path information with the path information may be understood as that the PCC actively allocates the IPV6 SID corresponding to the path information to the path.

At step S213, the PCC notifies the SRV6 binding information to the PCE through the PCEP.

At step S214, when the PCE does not receive the binding information sent by the PCC, the PCE sends a request message to the PCC.

At step S215, the PCC receives the request message sent by the PCE.

Here, the request message may be configured to request the PCC to allocate a corresponding IPV6 SID to the SR-TE path information when the PCE does not receive the SRV6 binding information sent by the PCC through PCEP, which may be understood as that, after the step 213, the PCE does not receive the SRV6 binding information sent by the PCC, and then the PCE may send the request message to the PCC to request the PCC to allocate the corresponding IPV6 SID to the path.

At step S216, the PCC allocates the IPV6 SID corresponding to the path information to the path information, to obtain the SRV6 binding information between the path information and the IPV6 SID.

At step S217, the PCC notifies the SRV6 binding information to the PCE through a report message of an extended PCEP.

Figure 2C:
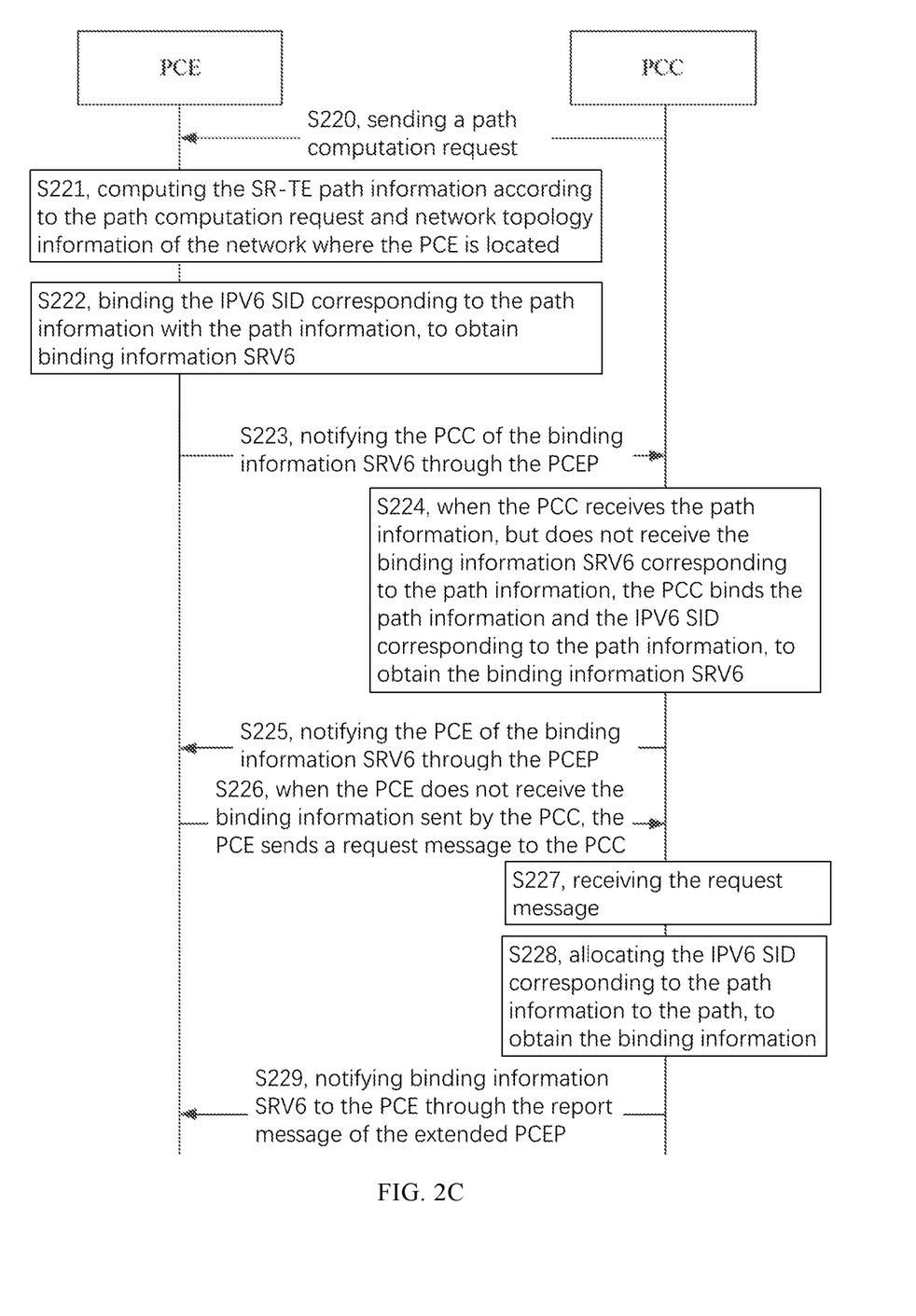
FIG. 2C is a schematic flowchart illustrating still another implementation flow of a method for notifying binding information according to an embodiment of the present disclosure.

FIG. 2C is a schematic flowchart illustrating still another implementation flow of a method for notifying binding information according to an embodiment of the present disclosure, and as shown in FIG. 2C, the method may include the following steps S220 to S229.

At step S220, the PCC sends a path computation request to the PCE.

Here, the path computation request may be used to request the PCE to perform path computation for the PCC.

At step S221, the PCE computes the SR-TE path information according to the path computation request and the network topology information of the network where the PCE is located.

At step S222, the PCE binds an IPV6 SID corresponding to the path information with the path information, to obtain SRV6 binding information between the path information and the IPV6 SID.

At step S223, the PCE notifies the SRV6 binding information to the PCC through the PCEP.

Here, the steps 221 to 223 may be understood as that, after the PCE computes the SR-TE path information, the PCE actively matches the path information with a corresponding IPV6 SID, and obtains the SRV6 binding information.

At step S224, when the PCC receives the path information sent by the PCE, but does not receive the SRV6 binding information corresponding to the path information sent by the PCE, the PCC binds the path information and the IPV6 SID corresponding to the path information, to obtain the SRV6 binding information between the path information and the IPV6 SID.

At step S225, the PCC notifies the SRV6 binding information to the PCE through the PCEP.

Steps 224 to 225 may be understood as that, when the PCE sends the path information to the PCC and does not send the SRV6 binding information corresponding to the path information to the PCC, the PCC actively allocates the IPV6 SID corresponding to the path information to the received path.

At step S226, when the PCE does not receive the binding information sent by the PCC, the PCE sends a request message to the PCC.

At step S227, the PCC receives the request message sent by the PCE.

At step S228, the PCC allocates the IPV6 SID corresponding to the path information to the path, to obtain the SRV6 binding information between the path information and the IPV6 SID.

At step S229, the PCC notifies SRV6 binding information to the PCE through a report message of an extended PCEP.

Here, the steps 226 to 229 may be understood as that, since the PCE does not receive the binding information sent by the PCC, the PCE sends the request message to the PCC, requesting the PCC to allocate an IPV6 SID corresponding to the path information to the path.

In the embodiment, first, the PCE actively matches the IPV6 SID for the computed path, and notifies the path and the SRV6 binding information to the PCC; when the PCC only receives the path information, the PCC firstly actively allocates a corresponding IPV6 SID for the path information to obtain SRV6 binding information and notifies the PCE of the binding information; when the PCC fails to actively allocate the corresponding IPV6 SID to the path information, the PCE sends a request message to the PCC to request the PCC to allocate the corresponding IPV6 SID to the path information; after receiving the request message, the PCC allocates the corresponding IPV6 SID to the path, and notifies the obtained SRV6 binding information to the PCE; in such way, whether the PCC or PCE matches the IPV6 SID for the path information, it can be guaranteed that the obtained SRV6 binding information is notified to a preset node.

In other embodiments, after step S204 or S223, that is, after the PCE notifies the SRV6 binding information to the PCC through the PCEP, the method may further include: updating, by the PCE, the IPV6 SID corresponding to the SR-TE path information according to the PCEP and an update message carried by the extended PCEP.

Here, when the PCE wants to update an original IPV6 SID of the path information, the original IPV6 SID is updated by the extended PCEP and the update message carried by the extended PCEP; the update message carried by the extended PCEP carries attribute information of the updated IPV6 SID, for example, the update message carries Type-Length-Value (TLV) of the IPV6 SID.

The method may further include: sending, by the PCE, the updated IPV6 SID corresponding to the SR-TE path information to the PCC.

In other embodiments, after the PCC receives the request message sent by the PCE in step S215 or S227, the method may further include: when the PCC cannot allocate the IPV6 SID corresponding to the SR-TE path information to the SR-TE path information, the PCC sends an error message to the PCE.

Here, the error message may be used to indicate that the PCC failed to match IPV6 SID for the SR-TE path information. When IPV6 SID tag resources stored by the PCC are not enough, the PCC cannot allocate the IPV6 SID corresponding to the SR-TE path information to the SR-TE path information.

Figure 3:
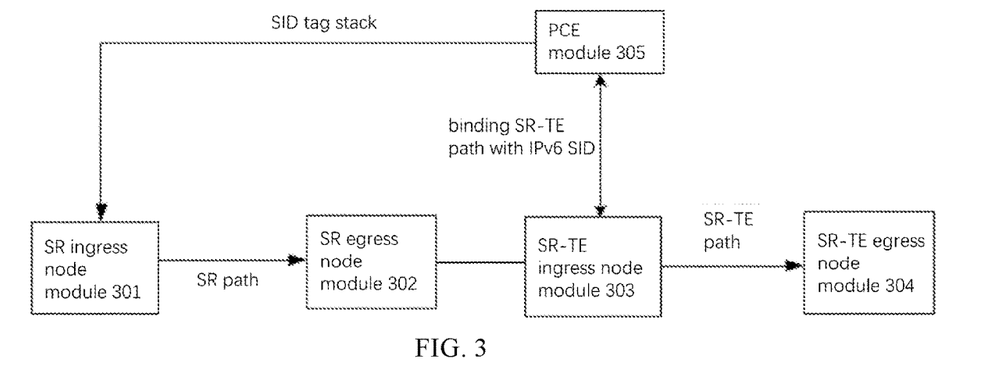
FIG. 3 is a schematic diagram of a deployment scenario of SRV6 binding information according to an embodiment of the present disclosure.

An embodiment of the present disclosure provides a method for notifying binding information, FIG. 3 is a schematic diagram of a deployment scenario of SRV6 binding information according to an embodiment of the present disclosure, and as shown in FIG. 3, a network deployment of the SRV6 binding information may include five modules: an SR ingress node module 301, an SR egress node module 302, an SR-TE ingress node module 303, an SR-TE egress node module 304, and a PCE module 305.

The SR ingress node module 301 and the SR egress node module 302 are connected through an SR path; i.e., the SR path is from the SR ingress node to the SR egress node.

The SR egress node module 302 is connected to the SR-TE ingress node module 303 (in an embodiment, the SR-TE ingress node is the PCC); as can be seen from FIG. 3, upon out from the SR egress node module 302, the SR-TE ingress node module 303 is entered into. The SR-TE ingress node module 303 is connected to the SR-TE egress node module 304 through an SR-TE path, i.e., the SR-TE path is from the SR-TE ingress node to the SR-TE egress node.

The SR-TE ingress node module 303 is connected to the PCE module 305, that is, the PCC is connected to the PCE. The SR-TE path is computed and obtained, by the PCE module 305, according to a path computation request sent by the PCC and network topology information of a network where the PCE is located, and the PCE module 305 is connected to the SR-TE ingress node module 303 (PCC), so that the PCE or the PCC may complete allocating of a corresponding IPV6 SID to the SR-TE path.

Figure 4:
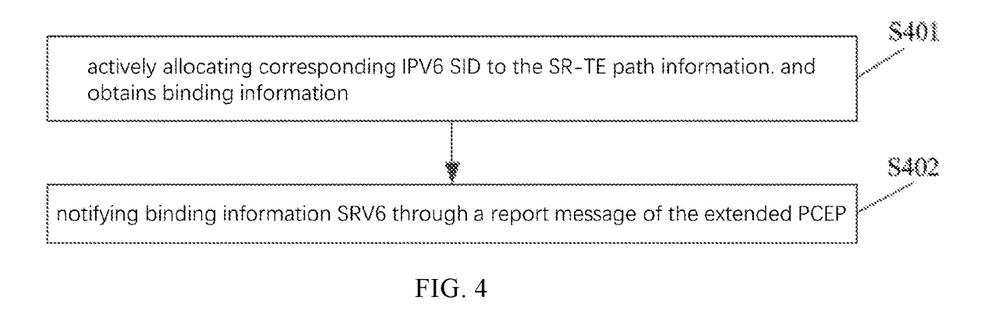
FIG. 4 is a schematic flowchart illustrating a PCE actively allocating an IPV6 SID to an SR-TE path according to an embodiment of the present disclosure.

FIG. 4 is a schematic flowchart illustrating a PCE actively allocating an IPV6 SID to an SR-TE path according to an embodiment of the present disclosure, as shown in FIG. 4, the method may include the following steps 401 and 402.

At step 401, the PCE actively allocates a corresponding IPV6 SID to the SR-TE path information, and obtains SRV6 binding information between the SR-TE path information and the IPV6 SID.

Here, the PCE actively allocating the corresponding IPV6 SID to the SR-TE path information may be understood as that after the PCE computes and obtains the SR-TE path information according to a path computation request sent by the PCC and network topology information of a network where the PCE is located, the PCE matches the SR-TE path information with the corresponding IPV6 SID.

At step 402, the PCE notifies the SRV6 binding information to the PCC through a report message of an extended PCEP.

Here, when the PCE wants to update the IPV6 SID of current SR-TE path information, an original IPV6 SID may be updated through the extended PCEP and an update message carried by the extended PCEP; the update message carries TLV of the updated IPV6 SID.

Figure 5:
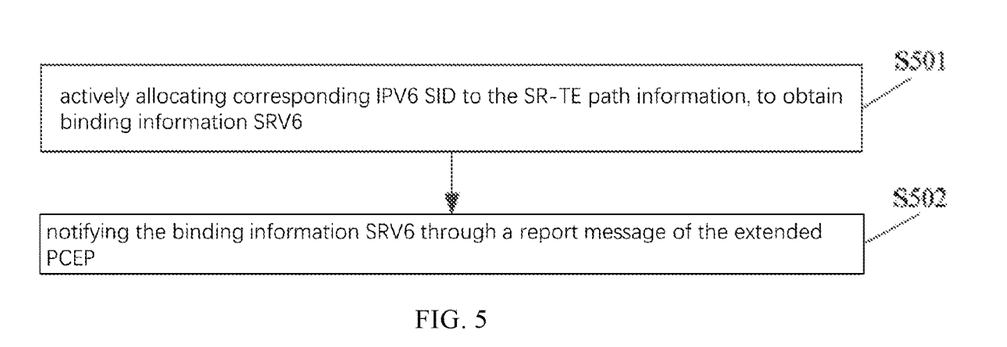
FIG. 5 is a schematic flowchart illustrating a PCC actively allocating an IPV6 SID to an SR-TE path according to an embodiment of the present disclosure.

When the PCE does not actively allocate the corresponding IPV6 SID to the SR-TE path information, that is, when the PCE sends the SR-TE path information to the PCC without sending the SRV6 binding information to the PCC, the PCC may actively allocate a corresponding IPV6 SID to the received SR-TE path from the locally stored IPV6 SID tag resources, as shown in FIG. 5, the method may include the following steps 501 and 502.

At step 501, the PCC actively allocates the corresponding IPV6 SID to the received SR-TE path information, to obtain SRV6 binding information between the SR-TE path information and the IPV6 SID.

At step 502, the PCC notifies the SRV6 binding information to the PCE through a report message of an extended PCEP.

Here, when the PCC wants to update the IPV6 SID corresponding to current SR-TE path information, the PCC may first send an authorization notification to the PCE; the authorization notification may be used to indicate that the PCE is able to update the IPV6 SID.

The PCE may update the IPV6 SID corresponding to the current SR-TE path according to the received authorization notification, the extended PCEP, and the update message carried by the extended PCEP.

Figure 6:
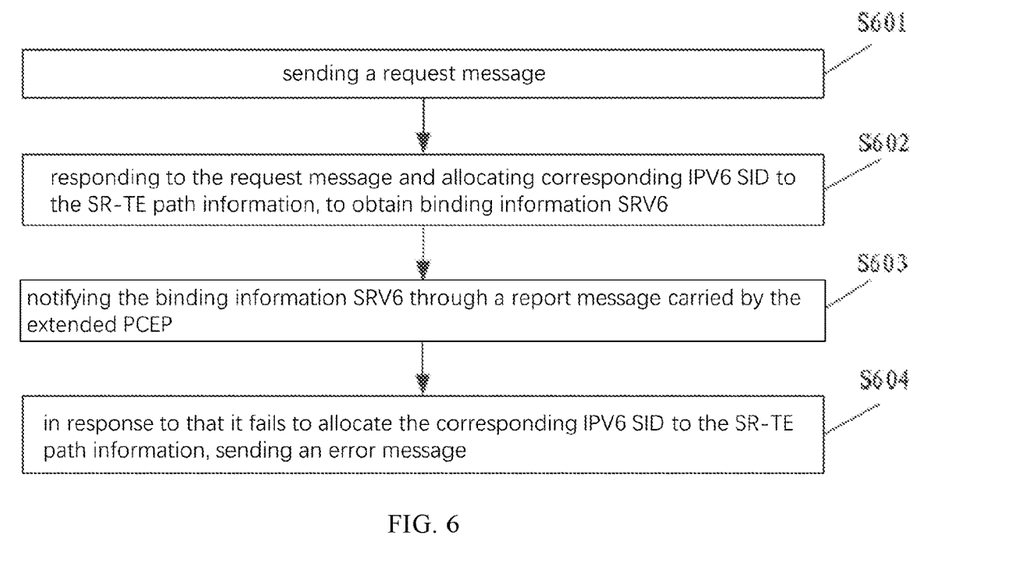
FIG. 6 is a flowchart illustrating a PCE requesting a PCC to allocate an IPV6 SID to an SR-TE path according to an embodiment of the present disclosure.

When the PCE does not actively allocate a corresponding IPV6 SID to the SR-TE path information, that is, when the PCE sends the SR-TE path information to the PCC, and the PCC does not actively allocate a corresponding IPV6 SID to the SR-TE path, that is, the PCE does not receive the SRV6 binding information sent by the PCC, at this time, the PCE may send a request message to the PCC to request the PCC to allocate a corresponding IPV6 SID to the SR-TE path information, as shown in FIG. 6, the method may include the following steps 601 to 604.

At step 601, the PCE sends a request message to the PCC.

Figure 7:
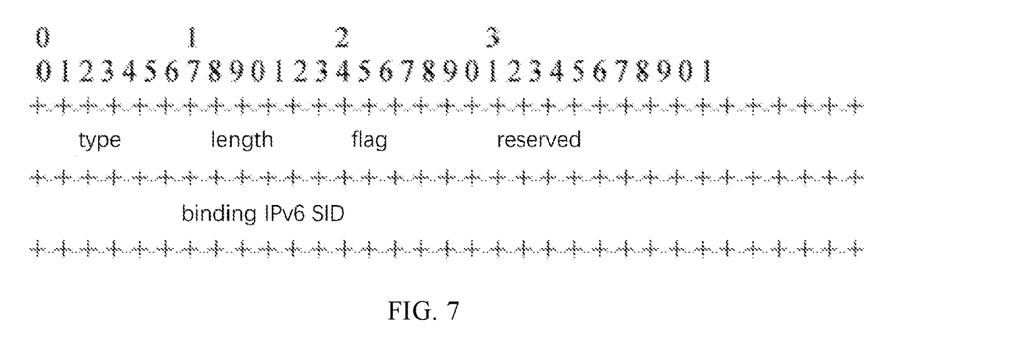
FIG. 7 is a schematic diagram of an encapsulation format of SRV6 binding information according to an embodiment of the present disclosure.

Here, the PCE may send the request message to the PCC by an update message carried by an extended PCEP. The request message may be used to request the PCC to allocate a corresponding IPV6 SID to the SR-TE path information when the PCE does not receive the SRV6 binding information sent by the PCC through the PCEP. An encapsulation format of the SR-TE path binding IPV6 SID (i.e., SRV6 binding information) is shown in FIG. 7, and the encapsulation format of the SRV6 binding information may include a type of the SRV6 binding information, a length of bytes included in the SRV6 binding information, a flag of the SRV6 binding information, and a reserved space after the SRV6 binding information is encapsulated.

At step 602, the PCC responds to the request message and allocates a corresponding IPV6 SID to the SR-TE path information, to obtain the SRV6 binding information.

Here, the PCC may allocate the corresponding IPV6 SID to the SR-TE path information, and when the allocating is successful, the flow proceeds to step S603; when the allocating fails, the flow proceeds to step S604.

At step 603, the PCC notifies the PCE of the SRV6 binding information through a report message carried by the extended PCEP.

Here, the binding information may be carried in an object of an Explicit Routing Object (ERO) in the report message.

At step 604, when the PCC fails to allocate the corresponding IPV6 SID to the SR-TE path information, the PCC sends an error message to the PCE.

Here, when IPV6 SID tag resources stored by the PCC are not enough, the PCC may not allocate an IPV6 SID corresponding to the SR-TE path information to the SR-TE path information, that is, the PCC may send the error message to the PCE, and the error message is used to indicate that the PCC fails to allocate a corresponding IPV6 SID to the SR-TE path information.

Figure 8:
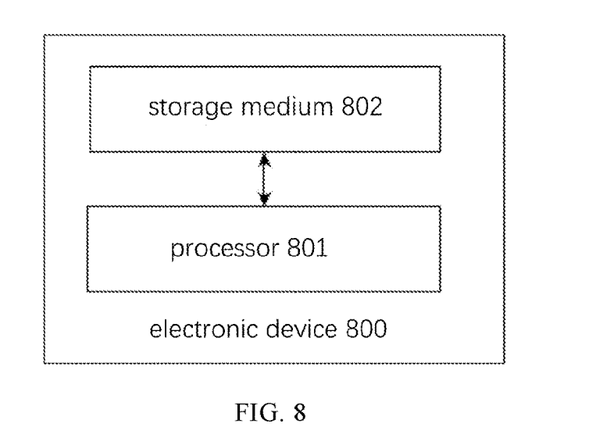
FIG. 8 is a schematic structural diagram of components of an electronic device for notifying binding information according to an embodiment of the present disclosure.

An embodiment of the present disclosure provides an electronic device for notifying binding information, FIG. 8 is a schematic diagram of a structure of the electronic device for notifying binding information according to an embodiment of the present disclosure, and as shown in FIG. 8, the electronic device 800 may at least include a processor 801 and a storage medium 802 configured to store executable instructions.

The processor 801 is configured to execute the executable instructions for implementing the following steps: acquiring, by an allocation node, SR-TE path information; binding, by the allocation node, an Internet Protocol version 6 Segment Identifier (IPV6 SID) corresponding to the SR-TE path information with the SR-TE path information to obtain SRV6 binding information between the SR-TE path information and the IPV6 SID; and notifying, by the allocation node, the SRV6 binding information to a preset node through an extended path computation element protocol (PCEP).

It can be understood that, in the embodiment of the present disclosure, when the method for notifying binding information is implemented in a form of a software functional module and sold or used as a separate product, it may also be stored in a computer readable storage medium. Based on such understanding, the technical solutions of the embodiments of the present disclosure or portions thereof that contribute to the technology known in the art may be embodied in a form of a software product, which is stored in a storage medium and includes instructions for causing a computer device (which may be a personal computer, a server, or a network device) to execute all or a part of the method described in the embodiment of the present disclosure. The aforementioned storage medium includes: various media capable of storing program codes, such as a USB disk, a removable hard disk, a Read Only Memory (ROM), a magnetic disk, or an optical disk. Thus, the embodiments of the present disclosure are not limited to any specific combination of hardware and software.

Correspondingly, an embodiment of the present disclosure provides a computer storage medium having computer-executable instructions stored therein, the computer-executable instructions being configured to perform the method for notifying binding information according to the embodiments of the present disclosure.

The embodiments of the present disclosure provide the method and the device for notifying binding information and the storage medium, firstly, the allocation node acquires SR-TE path information; then, the allocation node binds an IPV6 SID corresponding to the SR-TE path information with the SR-TE path information to obtain SRV6 binding information between the SR-TE path information and the IPV6 SID; finally, the allocation node notifies the SRV6 binding information to a preset node through an extended PCEP; in such way, the SR-TE path is bound to the IPV6 SID, and the binding information is passed to a corresponding node through the PCEP, so as to implement notifying of the SRV6 binding information.

As will be appreciated by one of skill in the art, the embodiments of the present disclosure may be provided as a method, a system, or a computer program product. Accordingly, the present disclosure may take a form of a hardware embodiment, a software embodiment, or an embodiment combining software and hardware. Furthermore, the present disclosure may take a form of a computer program product embodied on one or more computer-usable storage media (including, but not limited to, disk storage, optical storage, and the like) having computer-usable program codes embodied therein.

The present disclosure is described with reference to flowcharts, or block diagrams, or both of flowcharts and block diagrams of the method, the device (system), and the computer program product according to embodiments of the present disclosure. It will be understood that each flow in the flowcharts, or each block in the block diagrams, or each flow and each block in the flowcharts and the block diagrams, and a combination of flows in the flowcharts, or a combinations of blocks in the block diagrams, or a combination of a flow in the flowcharts and a block in the block diagrams, may be implemented by computer program instructions. These computer program instructions may be provided to a processor of a general purpose computer, a special purpose computer, an embedded processor, or any other programmable data processing apparatus to produce a machine, such that the instructions, when executed by the processor of the computer or any other programmable data processing apparatus, create means for implementing functions specified in the flow or flows of the flowcharts, or in the block or blocks of the block diagrams, or in at least one flow of the flowcharts and at least one block of the block diagrams.

These computer program instructions may also be stored in a computer-readable memory that can direct a computer or any other programmable data processing apparatus to function in a particular manner, such that the instructions stored in the computer-readable memory produce an article of manufacture including instruction means which implements the functions specified in the flow or flows of the flowcharts, or in the block or blocks of the block diagrams, or in at least one flow of the flowcharts and at least one block of the block diagrams.

These computer program instructions may also be loaded onto a computer or any other programmable data processing apparatus to cause a series of operational steps to be performed on the computer or the programmable apparatus to produce a computer implemented process such that the instructions, when executed on the computer or the programmable apparatus, provide steps for implementing the functions specified in the flow or flows of the flowcharts, or in the block or blocks of the block diagrams, or in at least one flow of the flowcharts and at least one block of the block diagrams.

It will be understood by those of ordinary skill in the art that all or some of the steps of the method, functional modules/units in the system or device disclosed above may be implemented as software, firmware, hardware, or a suitable combination thereof. In a hardware implementation, the division between functional modules/units mentioned in the above description does not necessarily correspond to the division of physical components; for example, one physical component may have multiple functions, or one function or step may be performed by several physical components in cooperation. Some or all of the components may be implemented as software executed by a processor, such as a digital signal processor or a microprocessor, or implemented as hardware, or as an integrated circuit, such as an application specific integrated circuit. Such software may be distributed on computer readable media, which may include computer storage media (or non-transitory media) and communication media (or transitory media). The term computer storage media include volatile and nonvolatile, removable and non-removable media implemented in any method or technology for storage of information such as computer readable instructions, data structures, program modules or other data, as well known to those skilled in the art. The computer storage media include, but are not limited to, Random Access Memory (RAM), Read-Only Memory (ROM), Electrically Erasable Programmable Read-Only Memory (EEPROM), flash Memory or any other Memory technology, Compact disk Read-Only Memory (CD-ROM), Digital Versatile Disks (DVD) or any other optical disk storage, magnetic cassette, magnetic tape, magnetic disk storage or any other magnetic storage device, or any other medium which can be used to store the desired information and can be accessed by a computer. In addition, communication media typically include computer readable instructions, data structures, program modules or any other data in a modulated data signal such as a carrier wave or any other transport mechanism and include any information delivery media as well known to those skilled in the art.

It will be understood by those skilled in the art that various modifications may be made and equivalents may be substituted without departing from the spirit and scope of embodiments of the present disclosure, and these modifications and equivalents are considered to be within the scope of the claims.

What is claimed is:

1. A method for notifying binding information, comprising:
   acquiring, by an allocation node, segment routing-traffic engineering (SR-TE) path information;
   binding, by the allocation node, an Internet Protocol version 6 Segment Identifier (IPV6 SID) corresponding to the SR-TE path information with the SR-TE path information to obtain SRV6 binding information between the SR-TE path information and the IPV6 SID; and
   notifying, by the allocation node, the SRV6 binding information to a preset node through an extended path computation element protocol (PCEP).

2. The method of claim 1, wherein in response to that the allocation node is a Path Computation Element (PCE), and the preset node is a Path Computing Client (PCC), the step of acquiring, by the allocation node, the SR-TE path information comprises:
   computing and obtaining, by the PCE, the SR-TE path information according to a path computation request sent by the PCC and network topology information of a network where the PCE is located;
   and the step of notifying the SRV6 binding information to the preset node through the extended PCEP comprises:
   notifying, by the PCE, the SRV6 binding information to the PCC through the extended PCEP.

3. The method of claim 2, wherein after the step of notifying, by the PCE, the SRV6 binding information to the PCC through the extended PCEP, further comprises:
   updating, by the PCE, the IPV6 SID corresponding to the SR-TE path information according to the extended PCEP and an update message carried by the extended PCEP; wherein,
   the update message carried by the extended PCEP carries updated attribute information of the IPV6 SID; and
   sending, by the PCE, the updated IPV6 SID corresponding to the SR-TE path information to the PCC.

4. The method of claim 1, wherein in response to that the allocation node is a PCC and the preset node is a PCE, the step of acquiring, by the allocation node, the SR-TE path information comprises:
   receiving, by the PCC, the SR-TE path information sent by the PCE;
   and the step of notifying the SRV6 binding information to the preset node through the extended PCEP comprises:
   notifying, by the PCC, the SRV6 binding information to the PCE through the extended PCEP.

5. The method of claim 4, wherein after the step of receiving, by the PCC, the SR-TE path information sent by the PCE, further comprises:
   in response to that the PCC receives the SR-TE path information sent by the PCE but does not receive the SRV6 binding information corresponding to the SR-TE path information sent by the PCE, binding, by the PCC, the SR-TE path information with the IPV6 SID corresponding to the SR-TE path information to obtain the SRV6 binding information between the SR-TE path information and the IPV6 SID.

6. The method of claim 4, further comprising:
   receiving, by the PCC, a request message sent by the PCE; wherein, the request message is configured to request the PCC to allocate a corresponding IPV6 SID to the SR-TE path information in response to that the PCE does not receive the SRV6 binding information sent by the PCC through the extended PCEP; and
   allocating, by the PCC, the IPV6 SID corresponding to the SR-TE path information to the SR-TE path information to obtain SRV6 binding information between the SR-TE path information and the IPV6 SID.

7. The method of claim 6, wherein after the step of receiving, by the PCC, a request message sent by the PCE, further comprises:
   in response to that the PCC cannot allocate the IPV6 SID corresponding to the SR-TE path information to the SR-TE path information, sending, by the PCC, an error message to the PCE; wherein the error message is configured to indicate that the PCC fails to match the IPV6 SID for the SR-TE path information.

8. A device for notifying binding information, comprising: a processor and a storage medium configured to store executable instructions, wherein:
   the processor is configured to execute the executable instructions configured to perform the method for notifying binding information according to claim 1.

9. A non-transitory computer-readable storage medium having computer-executable instructions stored thereon, the computer-executable instructions configured to perform the method for notifying binding information according to claim 1.

* * * * *